United States Patent [19]
Haskell et al.

[11] Patent Number: 5,287,182
[45] Date of Patent: Feb. 15, 1994

[54] TIMING RECOVERY FOR VARIABLE BIT-RATE VIDEO ON ASYNCHRONOUS TRANSFER MODE (ATM) NETWORKS

[75] Inventors: Barin G. Haskell, Tinton Falls; Amy R. Reibman, East Windsor, both of N.J.

[73] Assignee: AT&T Bell Laboratories, Murray Hill, N.J.

[21] Appl. No.: 907,943

[22] Filed: Jul. 2, 1992

[51] Int. Cl.$^5$ .......................... H04N 5/04; H04N 7/04
[52] U.S. Cl. .................................. 348/500; 375/118; 348/484
[58] Field of Search ............... 358/149, 143, 148, 133, 358/134, 158; 375/118, 119, 120; 370/105.3, 108; H04N 5/04, 7/04

[56] References Cited

U.S. PATENT DOCUMENTS

| | | | |
|---|---|---|---|
| 4,716,575 | 12/1987 | Douros et al. | 375/118 X |
| 5,007,070 | 4/1991 | Chao et al. | 375/118 |
| 5,111,292 | 5/1992 | Kuriacose et al. | 358/133 |
| 5,138,440 | 8/1992 | Radice | 370/110.1 |
| 5,159,447 | 10/1992 | Haskell et al. | 358/133 |

OTHER PUBLICATIONS

"Digital Video Transmission and Coding for the Broadband ISDN", IEEE Transactions on Consumer Electronics, vol. 34, No. 1, Feb. 1988, pp. 16-35.
"Fixed Distortion Subband Coding of Images for Packet-Switched Networks," IEEE Journal on Selected Areas in Communications, vol. 7, No. 5, J. C. Darragh et al., pp. 789-900, Jun. 1989.
"Two-Layer Coding of Video Signals for VBR Networks," IEEE Journal on Selected Areas in Communications, vol. 7 No. 5, M. Ghanbari, pp. 771-781, Jun. 1989.
"DCT-Based Embedded Coding for Packet Video," Image Communication, A. R. Reibman, pp. 231-237, Jun. 1991.
"Variable Bit-Rate Coding of Video Signals for ATM Networks," IEEE Journal on Selected Areas in Communications, vol. 7, No. 5, F. Kishino et al., pp. 801-806, Jun. 1989.

Primary Examiner—James J. Groody
Assistant Examiner—Safet Metjahic
Attorney, Agent, or Firm—Thomas Stafford

[57] ABSTRACT

Complications of timing recovery in an ATM receiver are overcome by employing a first phase lock loop including a phase comparator, filter, voltage controlled oscillator (VCO) and output counter to lock to systems clock reference (SCR) values which are asynchronously received from a remote ATM transmitter. The SCR values represent the instantaneous values of a system timing clock (STC) at the instant of transmission of the asynchronous SCR values. In the receiver, the output counter is first set to the value of the initial received SCR value so that the derived STC is available for decoding data cells in the initial received packets. Then, so-called Presentation/Decode Time Stamps (PTS/DTS) included in the audio and video data are advantageously employed in conjunction with STC to display properly the received data. Invention, underflow of the receiver data buffers is alleviated by the addition of a "jitter-delay ($D_j$)" value which causes an extra accumulation of data in the data buffers prior to decoding. Dynamic tracking of the jitter-delay of the channel is obtained by monitoring the fullness of the data buffers and controllably adjusting the jitter-delay, accordingly. The stability of the decoder video timing is enhanced by employing an additional phase locked loop in a video display control which is supplied with a timing error signal. The additional phase locked loop includes a switch, filter, clipper and voltage controlled oscillator (VCO). The switch is enabled in response to output pulses from the VCO to supply the instantaneous error signal input to the filter for each so-called video presentation unit. The VCO has a very stable center frequency which variation is limited by clipping an input control voltage to some small voltage range. Output pulses from the VCO are employed to enable decoding of the presentation units. Faster synchronization is provided at start-up by increasing, via control of the clipper, the allowable voltage range of the VCO.

16 Claims, 5 Drawing Sheets

TIMING RECOVERY FOR VARIABLE BIT-RATE VIDEO ON ASYNCHRONOUS TRANSFER MODE (ATM) NETWORKS

TECHNICAL FIELD

This invention relates to digital transmission of video information and, more particularly, to timing recovery for variable bit-rate video in an ATM digital receiver.

BACKGROUND OF THE INVENTION

Networks are known which support variable bit-rate transmission by partitioning user data into a sequence of so-called "cells" and inputting them asynchronously to the network. One such network is the Broadband Integrated Services Digital Network (B-ISDN) and is referred to as an Asynchronous Transfer Mode (ATM) network.

ATM networks allow video information to be transmitted with variable bit-rate (VBR). This, in turn, allows statistical multiplexing of data from a relatively large number of users for transmission over a single data channel.

In the ISO Moving Picture Experts Group (MPEG) audio-video coding standard (ISO 11172 Committee Draft of ISO-IEC/JTC1/SC29/WG11), a system multiplexing capability is provided for combining bit streams from several audio, video and/or auxiliary data sources. At a receiver, a system demultiplexer supplies audio packets, including one or more cells, to audio decoders, video packets, including one or more cells, to video decoders and/or auxiliary packets, including one or more cells, to auxiliary decoders. So-called Presentation/Decode Time Stamps (PTS/DTS) in the data packets enable synchronization of the audio and video to be displayed at the receiver. The MPEG standard also provides for a Systems Time Clock (STC) of a predetermined nominal frequency that, in principle, could be locked to a constant rate channel clock. Audio and video clocks could, in principle, also be locked to the STC.

However, in many variable bit-rate or packetized channels there is no continuous channel clock for the receiver to lock to. Moreover, there may be "jitter delay" in the transmission of the data packets. Then, a receive STC must be derived from timing information that is transmitted from a remote receiver. In such arrangements, it is important substantially to eliminate the possibility of data overflow and/or underflow of data buffers in the receiver.

Another complication arises in arrangements in which the receiver video and audio clocks must be more stable than the STC.

SUMMARY OF THE INVENTION

The complications of timing recovery in an ATM receiver are overcome, in accordance with the principles of the invention, by employing a first phase lock loop including a phase comparator, filter, voltage controlled oscillator (VCO) and output counter to lock to systems clock reference (SCR) values which are asynchronously received from a remote ATM transmitter. The SCR values represent the instantaneous values of a system timing clock (STC) at the instant of transmission of the asynchronous SCR values. In the receiver, the output counter is first set to the value of the initial received SCR value so that the derived STC is available for decoding data cells in the initial received packets. Then, so-called Presentation/Decode Time Stamps (PTS/DTS) included in the audio and video data are advantageously employed in conjunction with STC to display properly the received data.

In one embodiment of the invention, underflow of the receiver data buffers is alleviated by the addition of a "jitter-delay $(D_j)$" value which causes an extra accumulation of data in the data buffers prior to decoding. In one exemplary embodiment, dynamic tracking of the jitter-delay of the channel is obtained by monitoring the fullness of the data buffers and controllably adjusting the jitter-delay, accordingly.

In another exemplary embodiment of the invention, the stability of the decoder video timing is enhanced by employing an additional phase locked loop in a video display control which is supplied with a timing error signal. The additional phase locked loop includes a switch, filter, clipper and voltage controlled oscillator (VCO). The switch is enabled in response to output pulses from the VCO to supply the instantaneous error signal input to the filter for each so-called video presentation unit. The VCO has a very stable center frequency which variation is limited by clipping an input control voltage to some small voltage range. Output pulses from the VCO are employed to enable decoding of the presentation units. In one embodiment, a faster synchronization is provided at start-up by increasing, via control of the clipper, the allowable voltage range of the VCO signal.

DETAILED DESCRIPTION

Figure 1:
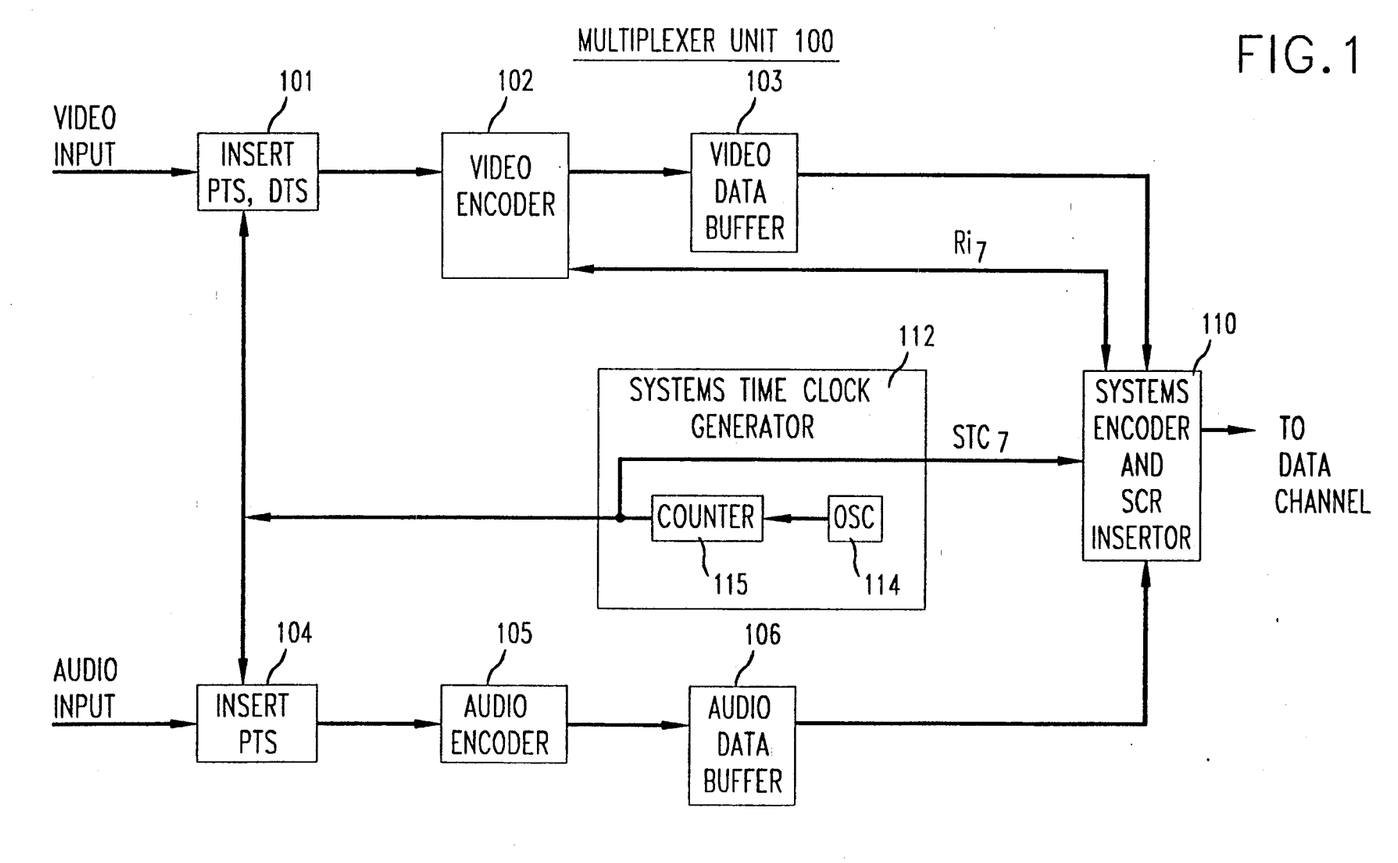
FIG. 1 shows, in simplified block diagram form, details of a multiplexer unit employed in an ATM network transmitter.
Figure 2:
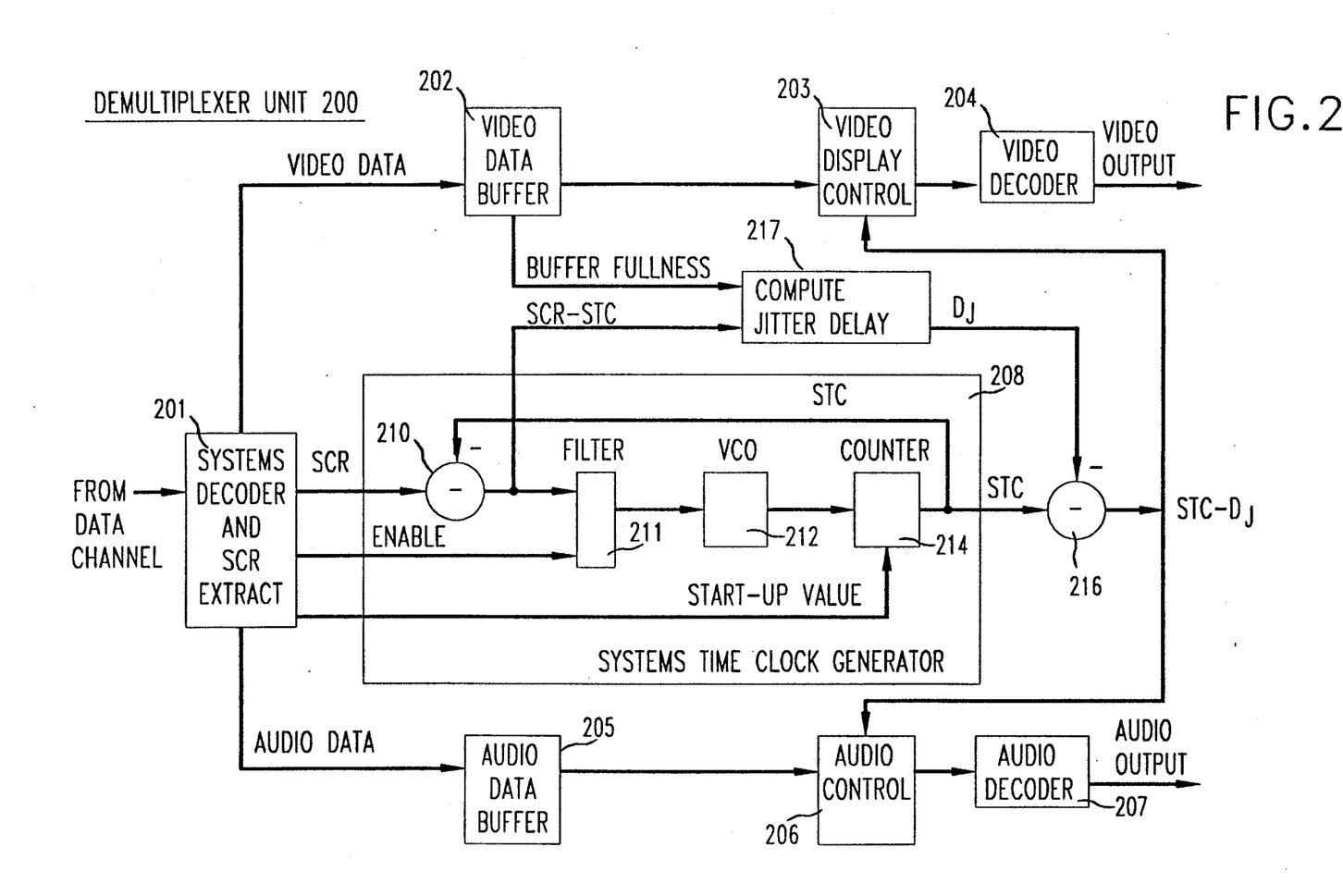
FIG. 2 shows, in simplified block diagram form, details of a demultiplexer unit employed in an ATM network receiver.

At the outset, it is noted that for brevity and clarity of exposition, only a single channel of video and its corresponding audio are illustrated in the multiplexer unit 100 of FIG. 1 and the demultiplexer unit 200 of FIG. 2. In practice, it will be apparent that a plurality of channels of video and corresponding audio will be employed to be multiplexed for transmission in multiplexer unit 100 and a similar plurality of channels of video and corresponding audio will be obtained via demultiplexer 200.

Specifically, multiplexer unit 100, shown in FIG. 1 in simplified form, includes in the video channel insert PTS, DTS unit 101, video encoder 102 and video data buffer 103. The audio channel includes insert PTS unit 104, audio encoder 105 and audio data buffer 106. Data from video data buffer 103 and audio data buffer 106 are supplied to systems encoder and SCR inserter 110. Systems time clock generator 112 includes oscillator 114 and output counter 115. The output of counter 115 is the STC value which is supplied to insert PTS, STS unit 101, insert PTS unit 104 and systems encoder and SCR inserter 110. It is noted that according to the MPEG specifications, the frequency for oscillator 114 shall be 90 kHz±50 ppm. Additionally, the frequency drift of oscillator 114 shall not exceed 250 microhertz/second. In this embodiment, counter 115 supplies a 33-bit STC value as an output that is incremented once for each pulse supplied from oscillator 114.

The video input data is first supplied to insert PTS, DTS unit 101 which inserts Presentation Time Stamps (PTS) on some or all of the image representations, i.e., picture frames. If a PTS is inserted on a non-Bidirectionally Predicted Image Representation (nonB-picture), then a Decoding Time Stamp (DTS) must also be inserted. For these image representations, PTS exceeds DTS (in picture periods) by one plus the number of bidirectional image representations to be encoded. The resulting "time stamped" video data then passes to video encoder 102 where it is encoded in known fashion. In turn, the encoded video data is supplied to video data buffer 103 to await transmission via systems encoder and SCR inserter 110.

The input audio is in the form of so-called Audio Access Units (AAU), which are supplied to insert PTS unit 104 where PTS values are inserted on some or all of the AAUs. Thereafter, the AAUs are supplied to audio encoder 105 where they are digitally encoded in well-known fashion and, thereafter, supplied to audio data buffer 106 to await transmission via systems encoder and SCR inserter 110.

The PTS/DTSs are employed to control the decoding and displaying of the audio and video data, in accordance with an aspect of the invention, in demultiplexer unit 200 (FIG. 2). The decoding and displaying in response to the PTS/DTSs are such as to maintain synchronism and to avoid overflow and underflow of data buffers in demultiplexer unit 200. Typically, the PTS/DTS values inserted by units 101 and 104 are equal to some constant value plus the instantaneous STC values from systems clock generator 112.

Systems encoder and SCR inserter 110 forms packs and packets of data and supplies them asynchronously to a data communications channel. Packs include packets from a plurality of video and audio encoders (not shown). Pack headers also contain SCR values that are the instantaneous values of STC from systems time clock generator 112. According to MPEG specifications, packs must be transmitted at least every 0.7 seconds. Additionally, the MPEG specifications assume that the channel data rate is constant for the duration of the pack.

The packets in a pack contain video or audio data with the PTS/DTS values, if any, moved to the packet header. Hence, for situations of more than one PTS/DTS per packet, all except the first are discarded.

$R_i$ is a representation of the number of bits being transmitted to the data channel during the coding of image representation (picture) i. For a current image representation being transmitted, systems encoder and SCR inserter 110 supplies to video encoder 102 the actual number of bits being transmitted. For future image representations, video encoder 102 supplies to systems encoder and SCR inserter 110 suggested values for the number of bits to be transmitted for each image representation. Systems encoder and SCR inserter 110 then chooses the actual values according to prescribed principles which are known (see, for example, our co-pending U.S. Pat. No. 5,159,447, issued Oct. 27, 1992, and our article entitled "Constraints on Variable Bit-Rate Video for ATM Networks", Document #AVC-56, CCITT STUDY GROUP XV WP XV/1, Experts Group for ATM Video Coding, May 21, 1991).

FIG. 2 shows, in simplified block diagram form, details of demultiplexer unit 200. Specifically, shown are system decoder and SCR extractor 201, which supplies video information to be decoded to video data buffer 202 where it is stored awaiting display. Video data from buffer 202 is supplied to video display control 203 and, eventually, to video decoder 204. Similarly, audio data is supplied from systems decoder and SCR extractor 201 to audio data buffer 205 where it is stored awaiting display. Audio data from buffer 205 is supplied to audio display control 206 and, eventually, to audio decoder 207. Systems decoder and SCR extractor 201 also detects the received system clock reference (SCR) values and passes them to systems time clock generator 208 along with an enable signal which indicates when there is a valid SCR value being received and a start up value.

Systems time clock generator 208 is a phase locked loop including phase comparator 210, filter 211, voltage controller oscillator (VCO) 212 and output counter 214. The enable signal from systems decoder and SCR extractor 201 is supplied to enable filter 211 when a valid SCR value is received. The start up value is supplied to set counter 214 to the value of the initial SCR value being received, in accordance with an aspect of the invention, so that the initial audio or video data in the packets of the initial received pack may properly be displayed. The STC output from counter 214 is compared in phase comparator 210 to the received SCR value. Filter 211 smooths the differences SCR-STC and generates a control voltage which is used to control the frequency of VCO 212.

In the absence of transmission jitter delay, and assuming that the center frequency of VCO 212 is close to that of the oscillator 114 in multiplexer unit 100 (FIG. 1), the control signal output of filter 212 will eventually stabilize to a small, nearly constant value. If the frequency of oscillator 114 (FIG. 1) drifts slightly upward, then the SCR values will increase slightly, producing a corresponding increase in the control voltage being supplied to VCO 212 which, in turn, increases its frequency. This, in turn, causes the STC values being supplied as an output from systems time clock generator 208 to increase slightly, thus tracking the values of the received SCR. Similarly, for a decrease in frequency of oscillator 114, the SCR and STC values in demultiplexer unit 200 track each other by also decreasing.

The amount of smoothing provided by filter 211, i.e., the time duration over which averaging occurs of the SCR-STC difference signal, determines how fast VCO 212 can respond. A small amount of smoothing by filter 211 can cause a rapid alignment of STC and SCR. However, if audio and video clocks were also derived from VCO 212, such a rapid alignment could be detrimental to the audio and video quality. In such an instance, significantly more smoothing by filter 211 may be necessary.

The gain of filter 211, or equivalently the input sensitivity of VCO 212, also has an effect on the frequency stability of the output pulses being supplied to counter 214. If the gain is large, then a small difference between SCR and STC will cause a large frequency shift in the output of VCO 212. If the gain is too large, then VCO 212 may never stabilize. If the gain is too small, stable operation could occur even if SCR and STC were not close to each other.

The audio and video decoder timing is controlled via Presentation/Decode Time Stamps (PTS/DTS) that are, as indicated above, included in the respective audio or video data. Assuming PTSs occur on every image representation, the DTS (PTS, if no DTS) of the oldest image representation stored in video data buffer 202 passes to video display control 203. Video display control 203 waits until the STC-$D_j$ value increases to the value of the oldest DTS. It then extracts the coded video data for the corresponding image representation from video data buffer 202 and passes it to video decoder 204 for decoding. For each video image representation input to decoder 204, the image representation is supplied as the video output for display. The video output may be the same image representation as the input (e.g., for B-pictures), or it may be a stored previously decoded picture (e.g., for nonB-pictures).

If an image representation does not have a DTS, then video display control 203 computes an extrapolated DTS value by simply adding the nominal picture duration to the DTS of the previous image representation. It is assumed that video decoder 204 always completes decoding each image representation before the next image representation is due to be decoded. When the oldest received (or extrapolated) audio PTS equals STC-$D_j$, then a next audio access unit in audio data buffer 205 is supplied via audio display control 206 to audio decoder 207. The decoded audio is immediately passed as the audio output corresponding to the video output to be displayed.

Figure 3:
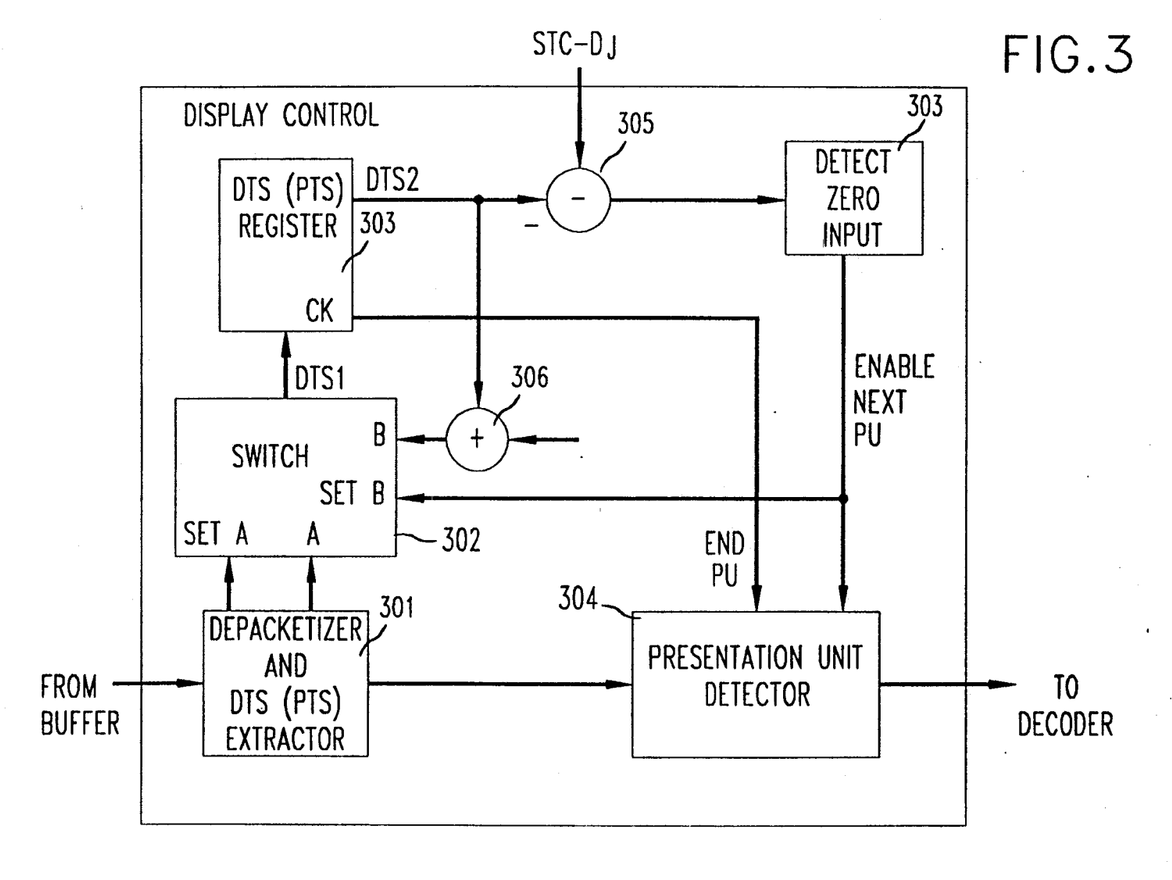
FIG. 3 shows, in simplified block diagram from, details of the display controls employed in the demultiplexer unit of FIG. 2.

Details of the video and audio display controls are shown in FIG. 3 and described below.

If there is substantial transmission jitter delay, then demultiplexer 200 may not operate correctly. this results because filter 211 of systems time clock generator 208 must average over a much longer time interval than in a jitter free situation. However, even if this is the case, a more serious problem is that the data arrival times may be considerably different than was assumed in multiplexer 100 (FIG. 1). When such an occurrence happens, there is a possibility of overflow or underflow of the video and/or audio data buffers in demultiplexer 200.

Overflow of the data buffers can be readily avoided by increasing the buffer sizes beyond what was assumed by the encoder in multiplexer 100. Underflow of the data buffers can be alleviated by the addition of a jitter delay $D_j$, which causes an extra accumulation of data in the data buffers prior to decoding. The additional stored data provides insurance against underflow. In fact, if bounds on jitter delay can be guaranteed, the possibility of underflow of the data buffers can be substantially eliminated by choosing sufficiently large buffers and a sufficiently large value for $D_j$. This value of jitter delay $D_j$ is then algebraically combined in subtractor 216 with STC to form STC-$D_j$. The amount of the delay for MPEG is given by $D_j/90000$ seconds. Then, the STC-$D_j$ value is supplied to be utilized in video display control 203 and audio display control 206 as described below.

In accordance with an aspect of the invention, dynamic tracking of jitter delay for the channel is realized by employing compute jitter delay unit 217 which dynamically generates jitter delay value $D_j$. The resulting dynamically obtained value of $D_j$ is supplied to a negative input of subtractor 216 to obtain the value STC-$D_j$. To substantially eliminate data buffer underflow, it is only necessary to insure that $D_j$ is sufficiently large. Data buffer underflow may occur if data is late in arriving, i.e., STC>SCR. Thus, a conservative choice of $D_j$ is the largest measured value of STC-SCR. In actual operation, $D_j$ is very slowly increased to the desired value without much effect on audio and video quality.

In this embodiment of the invention, the instantaneous fullness of video data buffer 202 is used to modulate the value of jitter delay $D_j$. To this end, the fullness value of video data buffer 202 is supplied to compute jitter delay unit 217 along with the SCR-STC value output from phase comparator 210.

Figure 4:
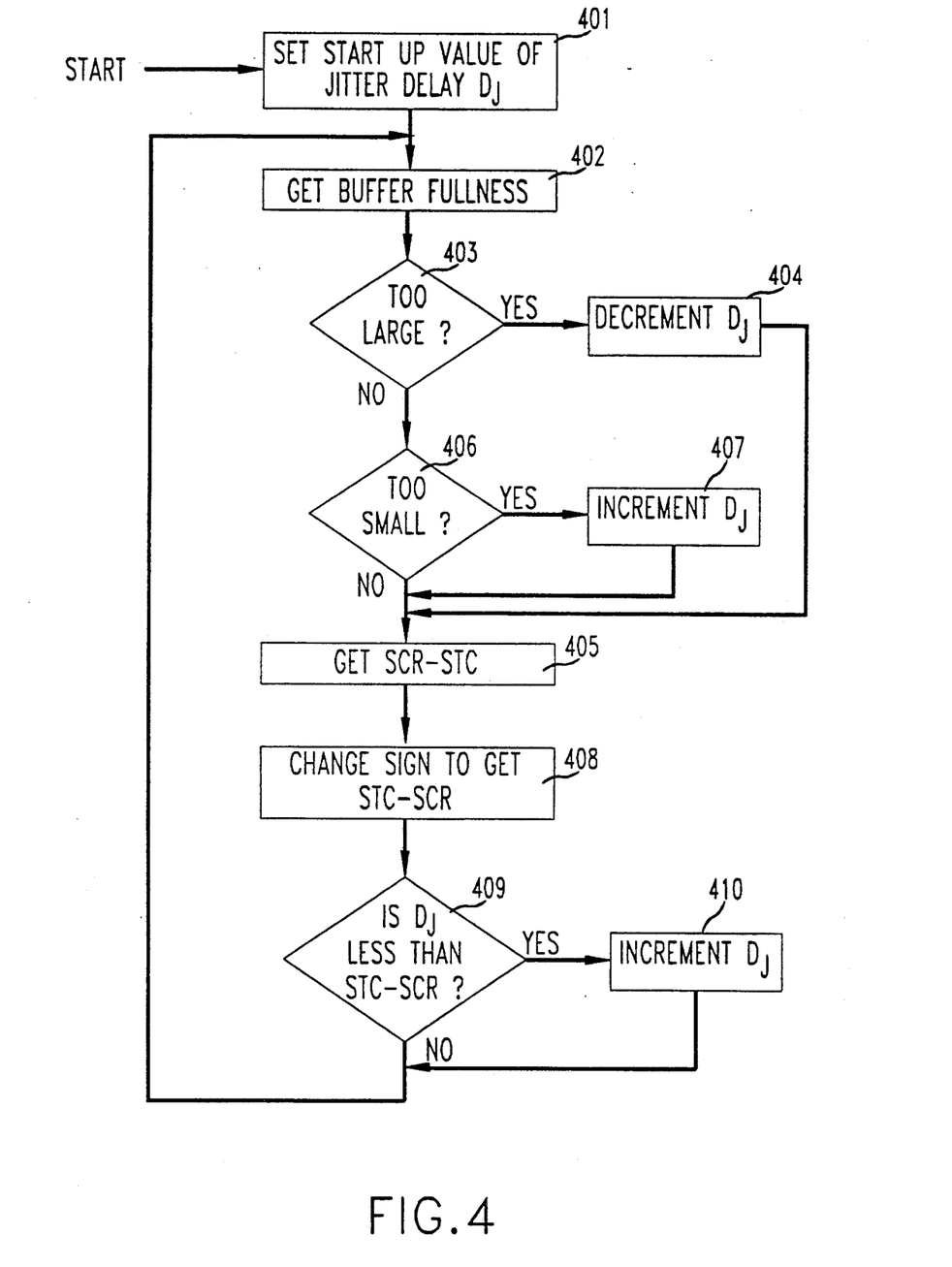
FIG. 4 is a flow chart illustrating the process of generating jitter-delay values in the compute jitter-delay unit of FIG. 2.

The compute jitter delay process is illustrated in the flow chart of FIG. 4. Specifically, at start of the process step 401 initializes the $D_j$ value to a nominal expected jitter delay value. Step 402 then reads the fullness of video data buffer 202. Step 403 tests to determine if the fullness value of video data buffer 202 is too large, indicating too much jitter delay. If the test result in step 403 is YES, step 404 causes the value of $D_j$ to be decremented. Thereafter, control is passed to step 405. If the test result in step 403 is NO, step 406 tests to determine if the fullness of video data buffer 202 is too small. If the test result in step 406 is YES, step 407 causes the value of $D_j$ to be incremented. Thereafter, control is passed to step 405. If the test result in step 406 is NO, step 405 reads the value of SCR-STC from phase comparator 210. Step 408 causes the sign of the value obtained in step 405 to be changed to obtain STC-SCR. Then, step 409 tests to determine if the value of $D_j$ is less than the value of STC-SCR. If the test result in step 409 is YES, step 410 increments the value of $D_j$. If the test result in step 409 is NO, control is returned to step 402.

The amounts of the increments and decrements in the process of FIG. 4 depend on how fast an adaptation process is desired and upon how much stability is required in the audio and video outputs. Such determinations are left to be chosen by the implementor of the system.

FIG. 3 shows, in simplified block diagram form, details of a display control unit which may be employed for either video display control 203 or audio display control 206. It is noted that for audio display control 206 only PTS values are employed. Specifically shown is depacketizer and DTS (PTS) extractor 301 which strips off packet headers and detects the presence of DTS and/or PTS. (The first packet received is required to contain a PTS.) If PTS/DTS is detected (set DTS=PTS if no DTS), then switch 302 is set to the A position via a signal from depacketizer and DTS (PTS) extractor 301, and the DTS value is supplied to the A input of switch 302. In turn, the supplied DTS value is supplied as an output by switch 302 as DTS1 to DTS (PTS) register 303.

After stripping off packet headers, depacketizer and DTS (PTS) extractor 301 passes the remaining packet data upon request to presentation unit (PU) detector 304. For video display control 203, a PU is an image representation (i.e., picture). For audio display control 206, a PU is an Audio Access Unit (AAU). At the start of every first PU (and no others), presentation unit detector 304 outputs a clock pulse that clocks DTS (PTS) register 303, thus causing its input DTS1 to be read, stored and then supplied as an output as DTS2 to subtractor 305 and adder 306. Then, presentation unit detector 304 waits.

STC-$D_j$ values are supplied to subtractor 305, where they are compared with the stored DTS2 values. The resulting difference STC-$D_j$-DTS2 is supplied to zero detector 307. When STC-$D_j$ increases to a value equal to DTS2, enable next PU signal is supplied as an output to presentation unit detector 304 and the set B input to switch 302. This allows the next PU to be passed to the decoder. For video display control 203, upon receiving this enable next PU signal presentation unit detector 304 transfers the data for the next PU to video decoder 204. Similarly, for audio display control 206, the enable next PU signal causes presentation unit detector 304 to transfer the data for the next PU to audio decoder 207. As indicated, the enable next PU signal also causes switch 302 to be set to the B position. If during the output of the PU depacketizer and DTS (PTS) extractor 301 detects a PTS/DTS, it sets switch 302 to the A position as before. However, if no PTS/DTS is detected, switch 302 remains in the B position.

At the end of a PU data transfer by presentation unit detector 304, it outputs a clock pulse to the clock input of DTS (PTS) register 303, as before. If a new DTS value has arrived, it is read, as before, from the A input of switch 302 and supplied as a DTS1 value to register 303 and appears as a DTS output value from register 303. However, if no new DTS value has arrived, then switch 302 still remains in the B position. In this situation, an extrapolated DTS value is supplied from adder 306 and is supplied as a new DTS1 value to register 303 and appears at an output thereof as DTS2. This extrapolated DTS value is obtained by adding via adder 306 a constant nominal picture duration value in units of STC to the previous DTS2 value. For example, if the nominal picture frequency is 29.97 Hz and the STC frequency is 90 kHz, then constant is 3003.

Presentation unit detector 304 then waits until STC-$D_j$ increases to this new value of DTS2, whereupon it receives an enable next PU signal (pulse) from zero detector 307, thus repeating the data output cycle.

In critical, high quality applications requiring a very stable video timing, the stability of systems time clock generator 208 may not be sufficient to acquire the desired quality level. For example, MPEG specifications call for the STC stability of ±50 ppm while the industry standard for the transmission video clock stability is ±3 ppm. Consequently an arrangement of enhancing the video timing and demultiplexer unit 200 is needed.

Figure 5:
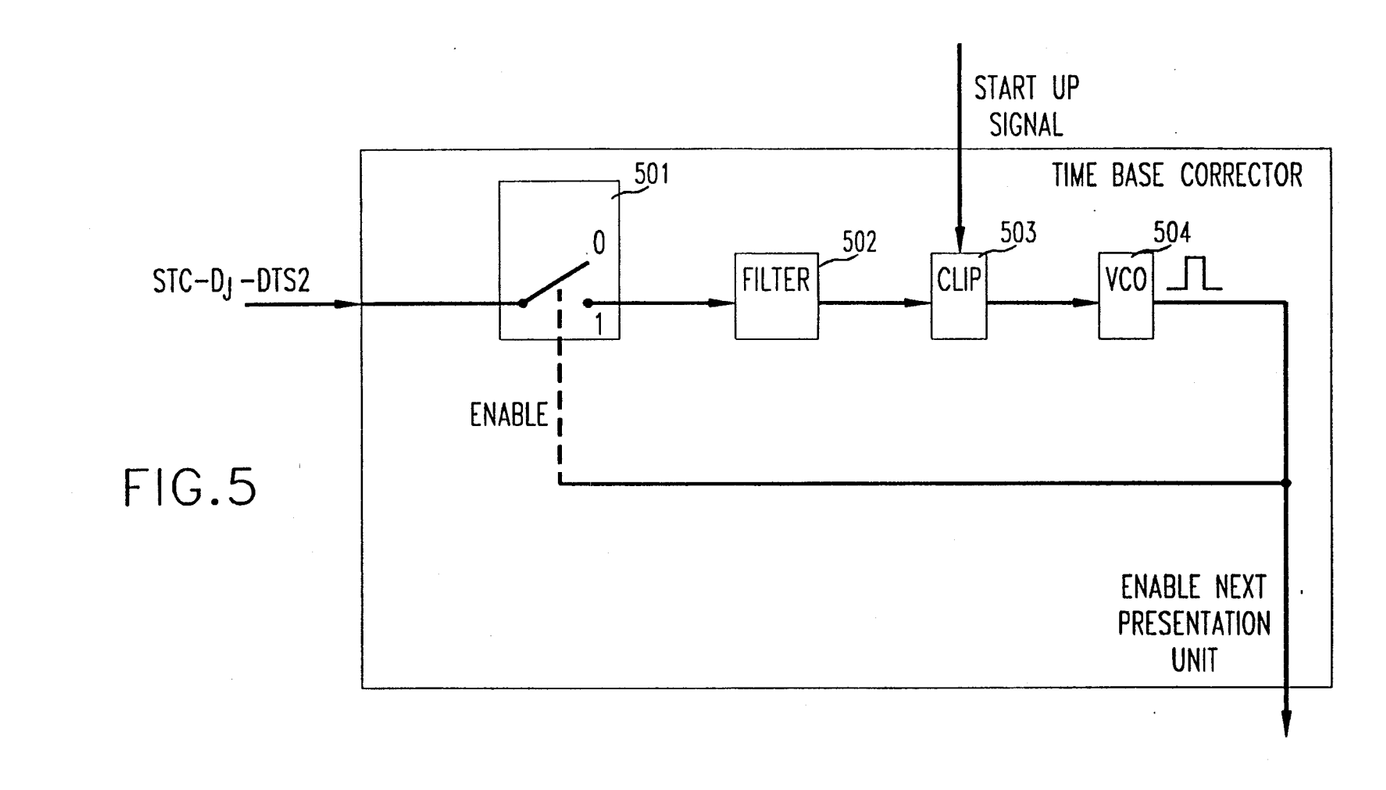
FIG. 5 shows, in simplified block diagram form, details of a time base corrector employed in the display control to enhance the stability of video timing.

To this end, FIG. 5 shows in simplified block diagram form, a time base correction circuit that can be employed in place of zero detector 307 in FIG. 3 to realize the desired quality of the video timing. Thus, as shown in FIG. 5, a timing error signal STC-$D_j$-DTS2 is supplied via switch 501, filter 502 and clipper 503 to voltage control oscillator (VCO) 504. Elements 501 through 504 form an additional phase lock loop. VCO 504 supplies as an output a train of short pulses at a nearly constant frequency. These output pulses are the enable next PU signals supplied to presentation unit detector 304 (FIG. 3) and are also supplied to switch 501.

VCO 504 has a very stable center frequency conforming to Video Industrial Standards, e.g., 20.9 Hz. Moreover, the frequency variation of VCO 504 is limited, for example, ±3 ppm during normal operation, by having its input control voltage clipped to some small range by clipper 503. During startup of the system, it may be desirable to provide for a faster synchronization by increasing the allowable control voltage range. This is realized by supplying a startup signal to clipper 503 to allow for the wider voltage control range. As indicated above, the enable next PU signals (pulses) from VCO 504 are also employed to enable switch 501. Each such enable next PU signal causes switch 501 to close, thereby allowing the instantaneous timing error signal input to be supplied to filter 502. Filter 502 averages the sampled timing error signals, typically over some time window, and passes the results to clipper 503. Judicious choices of filter duration and gain determine the stability and tracking rate of the phase lock loop of the time base corrector shown in FIG. 5.

The above-described arrangements are, of course, merely illustrative of the applications of the principles of the invention. Other arrangements may be devised by those skilled in the art without departing with the spirit and scope of the invention.

We claim:

1. Apparatus for recovering timing in a receiver comprising:
   means for receiving an asynchronous digital signal including system clock reference (SCR) values, an initially received SCR value being a start-up SCR value;
   means for extracting said SCR values from said received asynchronous digital signal;
   phase locked loop means having an input and an output for locking to said extracted SCR values being supplied to said input to generate a system timing clock (STC) signal at said output;
   means within said phase locked loop means in circuit with said output and being directly supplied with said start-up SCR value for setting said STC signal at said output to said start-up SCR value upon start-up; and
   means for supplying said start-up SCR value directly to said means for setting.

2. The apparatus as defined in claim 1 wherein said means for setting comprises a counter which is set to said start-up SCR value at start up for supplying said STC signal at said output.

3. The apparatus as defined in claim 1 wherein said phase locked loop means includes means supplied with said extracted SCR values and said STC signal for generating a phase error signal, and the apparatus further including buffer means for storing data from said received asynchronous signal, means for obtaining a fullness representation of said buffer means, means supplied with said phase error signal and said fullness representation for dynamically generating a jitter delay ($D_j$) value, and means for algebraically combining said $D_j$ value with said STC signal to generate a modified version of the STC signal.

4. Apparatus for recovering timing in a receiver comprising:
   means for receiving an asynchronous digital signal including system clock reference (SCR) values, an initially received SCR value being a start-up SCR value;
   means for extracting said SCR values from said received asynchronous digital signal;
   phase locked loop means having an input and an output for locking to said extracted SCR values being supplied to said input to generate a system timing clock (STC) signal at said output, said phase locked loop means including means supplied with said extracted SCR values and said STC signal for generating a phase error signal and means in circuit with said output and being directly supplied with said start-up SCR value for setting said STC signal at said output to said start-up SCR value upon start-up;

buffer means for storing data from said received asynchronous signal;

means for obtaining a fullness representation of the amount of data stored in said buffer means;

means supplied with said phase error signal and said fullness representation for dynamically generating a jitter delay ($D_j$) value; and means for algebraically subtracting said $D_j$ value from said STC signal to generate a modified representation of said system timing clock signal (STC-$D_j$).

5. The apparatus as defined in claim 4 wherein said modified representation of said system timing clock signal is utilized to control displaying video information received in said asynchronously received signal.

6. The apparatus as defined in claim 5 wherein said modified representation of said system timing signal is further utilized to play out audio information received in said asynchronously received signal.

7. The apparatus as defined in claim 6 wherein said buffer means comprises a video data buffer and said fullness representation is of the amount of video data stored in said video data buffer.

8. The apparatus as defined in claim 7 wherein the receiver further includes video display control means for controlling supplying video data presentation units stored in said video data buffer to a video decoder.

9. The apparatus as defined in claim 8 wherein the receiver further includes an audio data buffer and audio display control means for controlling supplying audio data representation units stored in said audio data buffer to an audio decoder.

10. The apparatus as defined in claim 9 wherein said video display control means is responsive to said modified representation of said system timing clock signal and to prescribed time stamp values received with said video data in said asynchronouslsy received signal for controlling the supplying of said video representation units to said video decoder.

11. The apparatus as defined in claim 10 wherein said audio display control means is responsive to said modified representation of said system timing clock signal and to prescribed time stamp values received with said audio data in said asynchronously received signal for controlling the supplying of said audio represtation units to said audio decoder.

12. The apparatus as defined in claim 10 wherein said video display control means includes time based corrector means for enhancing the transmissiosn timing of said video representation units being supplied to said video decoder.

13. The apparatus as defined in claim 12 wherein said time based corrector means includes second phase locked loop means responsive to a control signal representative of an algebraic combination of said modified system timing clock signal and a decoding time stamp value corresponding to the video presentation unit to be supplied to said video decoder.

14. Apparatus for recovering timing in a receiver comprising:

means for receiving an asynchronous digital signal including system clock reference (SCR) values;

means for extracting said SCR values from said received asynchronous digital signal;

phase locked loop means having an input and an output for locking to said extracted SCR values being supplied to said input to generate a system timing clock (STC) signal at said output, said phase locked loop means including means supplied with said extracted SCR values and said STC signal for generating a phase error signal;

buffer means for storing data from said received asynchronous signal;

means for obtaining a fullness representation of the amount of data stored in said buffer means;

means supplied with said phase error signal and said fullness representation for dynamically generating a jitter delay ($D_j$) value; and means for algebraically subtracting said $D_j$ value from said STC signal to generate a modified representation of said system timing clock signal (STC-$D_j$).

15. The apparatus as defined in claim 14 wherein said modified representation of said system timing signal is utilized to control displaying video information received in said asynchronously received signal.

16. The apparatus as defined in claim 15 wherein said modified representation of said system timing signal is further utilized to play out audio information received in said asynchronously received signal.

* * * * *